US008781767B2

(12) United States Patent
Hoogs et al.

(10) Patent No.: US 8,781,767 B2
(45) Date of Patent: Jul. 15, 2014

(54) SYSTEMS AND METHODS FOR DATA ANOMALY DETECTION

(75) Inventors: Bethany Hoogs, Niskayuna, NY (US); Jason Black, Niskayuna, NY (US); Yi Zhang, Niskayuna, NY (US); Weiwei Chen, Niskayuna, NY (US); Ming Li, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 441 days.

(21) Appl. No.: 13/213,899

(22) Filed: Aug. 19, 2011

(65) Prior Publication Data

US 2013/0046493 A1 Feb. 21, 2013

(51) Int. Cl.
*G06F 19/00* (2011.01)

(52) U.S. Cl.
USPC ............................... 702/61; 702/60; 702/179

(58) Field of Classification Search
None
See application file for complete search history.

(56) References Cited

U.S. PATENT DOCUMENTS

| 6,816,811 | B2 | 11/2004 | Seem |
| 7,146,288 | B1 | 12/2006 | Welch |
| 7,343,267 | B1 | 3/2008 | Casler et al. |
| 7,519,485 | B2 | 4/2009 | MacGregor |
| 7,881,889 | B2 | 2/2011 | Barclay et al. |
| 2003/0028350 | A1 | 2/2003 | Seem |
| 2003/0101009 | A1 | 5/2003 | Seem |
| 2007/0143045 | A1 | 6/2007 | Macgregor |
| 2009/0144122 | A1 | 6/2009 | Ginsberg et al. |
| 2009/0187445 | A1 | 7/2009 | Barclay et al. |
| 2010/0299118 | A1 | 11/2010 | Sharma et al. |
| 2010/0324962 | A1 | 12/2010 | Nesler et al. |
| 2011/0047418 | A1 | 2/2011 | Drees et al. |
| 2011/0061015 | A1 | 3/2011 | Drees et al. |

FOREIGN PATENT DOCUMENTS

| EP | 1309062 A2 | 5/2002 |
| EP | 1300771 A2 | 9/2003 |
| JP | 2005102428 A | 4/2005 |
| WO | 2009039500 A1 | 3/2009 |
| WO | 2009105112 A1 | 8/2009 |

OTHER PUBLICATIONS

Seem, "Pattern Recognition Algorithm for Determining Days of the Week with Similar Energy Consumption Profiles", Energy and Buildings, vol. 37, Issue 2, pp. 127-139, Feb. 2005.
Seem, "Using Intelligent Data Analysis to Detect Abnormal Energy Consumption in Buildings", Energy and Buildings, vol. 39, Issue 1, pp. 52-58, Jan. 2007.
Search Report and Written Opinion from corresponding EP Application No. 12180732.5-2221 dated Jan. 7, 2013.

*Primary Examiner* — Jonathan C Teixeira Moffat
*Assistant Examiner* — Hien Vo
(74) *Attorney, Agent, or Firm* — Nitin N. Joshi

(57) ABSTRACT

Systems and methods for performing data anomaly detection and/or removal are usable to accurately assess baseline power consumption. According to one embodiment of the invention, a system can be provided. The system can be operable to receive energy consumption data of a location; select, based at least in part on a collection period of the energy consumption data, an algorithm for detecting anomalies in the energy consumption data; perform the algorithm on the energy consumption data to detect the anomalies in the energy consumption data; and determine an energy consumption baseline for the location based at least in part on a result of the algorithm.

14 Claims, 3 Drawing Sheets

SYSTEMS AND METHODS FOR DATA ANOMALY DETECTION

FIELD OF THE INVENTION

Embodiments of the invention relate generally to data anomaly detection, and more specifically to detecting and removing data anomalies for assessing baseline energy consumption.

BACKGROUND OF THE INVENTION

Baseline energy consumption patterns can be used for measuring and verifying as well as determining incentive payments for demand response programs. Power plants often assess a consumer's baseline energy consumption by using formulaic approaches that average consumption over a specified time period. The consumption data may be chosen based on historical time periods, similar weather, or other characteristics similar to the specified time period. However, due at least in part to a generally small sample size, anomalous data may adversely affect the assessment. As such, finding ways to detect and remove anomalous data continues to be a priority.

BRIEF DESCRIPTION OF THE INVENTION

Some or all of the above needs and/or problems may be addressed by certain embodiments of the invention. Disclosed embodiments may include a system. According to one embodiment of the invention, the system may be operable to receive energy consumption data of a location; select, based at least in part on a collection period of the energy consumption data, an algorithm for detecting anomalies in the energy consumption data; perform the algorithm on the energy consumption data to detect the anomalies in the energy consumption data; and determine an energy consumption baseline for the location based at least in part on a result of the algorithm.

According to one aspect of the invention, there is disclosed a method for receiving energy consumption data of a location; selecting, based at least in part on a collection period of the energy consumption data, an algorithm for detecting anomalies in the energy consumption data; performing the algorithm on the energy consumption data to detect the anomalies in the energy consumption data; and determine an energy consumption baseline for the location based at least in part on a result of the algorithm.

Disclosed embodiments may also include a computer-readable media. According to one embodiment of the invention, the computer-readable media may store computer-executable instructions that, when executed by at least one processor, configure the at least one processor to perform operations comprising: receiving, from a data provider, energy consumption data of a facility of a customer; determining a collection period of the energy consumption data; selecting, based at least in part on the collection period of the energy consumption data, an algorithm for detecting anomalies in the energy consumption data; performing the algorithm on the energy consumption data to detect the anomalies in the energy consumption data; determining an energy consumption baseline for the location based at least in part on a result of the algorithm; labeling, based at least in part on the result of the algorithm, the detected anomalies; and filtering the detected anomalies from the energy consumption.

Other embodiments, aspects, and features of the invention will become apparent to those skilled in the art from the following detailed description, the accompanying drawings, and the appended claims.

BRIEF DESCRIPTION OF THE DRAWINGS

The detailed description is set forth with reference to the accompanying figures, which are not necessarily drawn to scale. In the figures, the left-most digit(s) of a reference number identifies the figure in which the reference number first appears. The use of the same reference numbers in different figures indicates similar or identical items.

DETAILED DESCRIPTION OF THE INVENTION

Figure 1:
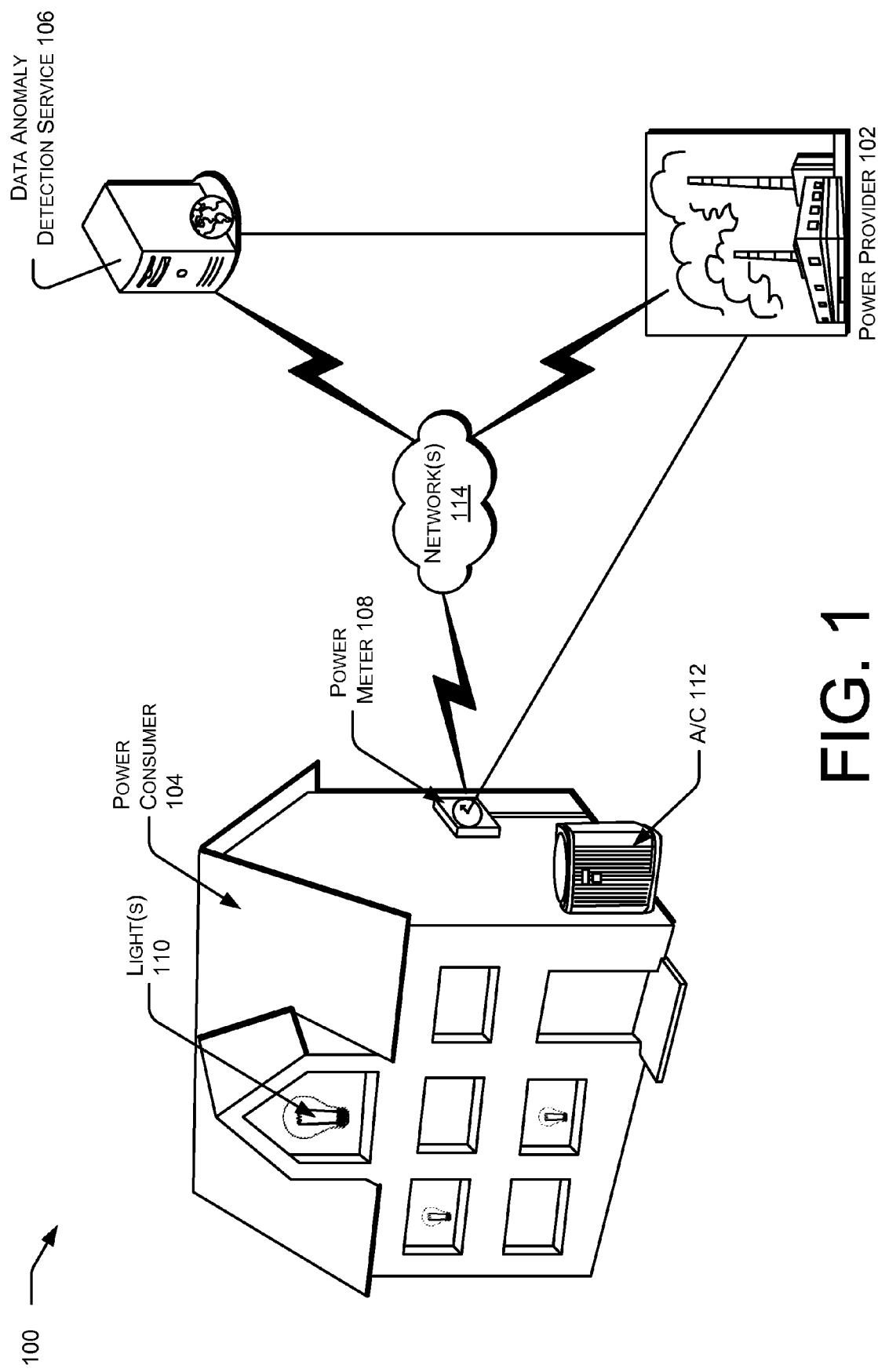
FIG. 1 illustrates a schematic diagram of an example architecture for performing anomaly detection, according to an illustrative embodiment of the invention.

Illustrative embodiments of the invention will now be described more fully hereinafter with reference to the accompanying drawings, in which some, but not all embodiments of the invention are shown. The invention may be embodied in many different forms and should not be construed as limited to the embodiments set forth herein; rather, these embodiments are provided so that this disclosure will satisfy applicable legal requirements. As noted above, like numbers refer to like elements throughout.

Illustrative embodiments of the invention are directed to, among other things, systems and methods for performing anomaly detection. As an overview, baseline energy consumption patterns can be used for measuring and verifying consumer usage as well as determining incentive payments for demand response programs directed at consumers. However, anomalous data may significantly skew baseline calculations. Certain embodiments of the invention may detect and remove anomalous data such that baseline calculations may provide more accurate results.

In some aspects, a power provider, or other power monitoring system or service, may be configured to receive and/or record power consumption data from a consumer. The power provider may wish to assess baseline consumption patterns for the consumer while accounting for anomalous data, such as caused by vacation days, days home sick from work, days with guests or other company, etc. The power provider may be configured to utilize historical energy consumption data, previously received and/or stored, to detect and label the days with abnormally high and/or low power consumption. The consumption data may be associated with a particular time period (e.g., daily, hourly, or shorter). In some aspects, the power provider may perform anomaly detection based on attribute-based, distribution-based, and/or regression-based algorithms.

In one example embodiment of the invention, a power provider, or other computing device in communication with the consumer and/or the power provider, may gather relevant and/or available premise energy data. In some aspects, this may include, but is not limited to, historical energy consumption data in daily, hourly, or shorter time periods, weather data, date and/or time data, and/or appliance data. The power provider may perform data mining on the consumption data and study the characteristics of normal and abnormal usage. In some aspects, the data mining can be implemented offline and/or can be performed once, multiple times, and/or iteratively.

Further, in one example embodiment of the invention, the power provider or other service may perform a linear regression (e.g., adaptive piecewise linear regression) to identify the correlation between energy consumption and temperature at the premise. The regression may deliver up to three pieces of linear functions which may describe the correlation between normal energy consumption and temperature. The parameters of each piecewise linear function may be calculated by minimizing the residual sum of squares. Then, the determination of the number of pieces may be based on F-statistics. The provider or service may then determine a method of anomaly detection based on the available consumption data. Some of the methods may have higher data requests than others. For example, a distribution-based method may request at least hourly data. There may also be trade-offs between different methods based on the data availability, purpose of the anomaly detection, and/or based on desired accuracy. In some aspects, if an attribute-based method is used, attributes for the data may be generated.

In an example embodiment of the invention, the provider or service may perform anomaly detection based on a determined method. In some aspects, the anomaly detection method may be selected based on the granularity of the data. For example, a distribution-based algorithm may be used when the granularity of the consumption data is roughly sixty minutes or less. However, other time periods may enable the distribution-based algorithm as well, including but not limited to, roughly sixty seconds or less, etc. In some aspects, a regression-based algorithm or an attribute-based algorithm may be selected when the granularity of the consumption data is more than sixty minutes. Again, other time periods may enable the regression-based algorithm as well, including but not limited to, roughly sixty seconds or less, etc. Further, in some aspects, selecting between either the regression-based or the attribute-based algorithms may be based on whether a threshold value exists from prior knowledge or historical data. That is, the regression-based algorithm may be used when a threshold value exists from prior knowledge or historical data while the attribute-based algorithm may be used when no threshold value exists. Additionally, the regression-based algorithm may be based on a correlation between energy consumption at the location and temperature at the location, while the attribute-based algorithm may be based on clustering pre-generated, daily-level summary attributes. In some aspects, combinations of the above algorithms may be utilized in any order. The provider or service may further label and/or filter the anomalous data from the sample. That is, days within the sample that have abnormally high and/or low energy consumption may be removed from the consumption data. Further, in some aspects, the provider or service may generate a baseline consumption pattern based on the filtered consumption data.

FIG. 1 depicts an illustrative architecture 100 in which techniques for performing anomaly detection and removal may be implemented. In some aspects, the architecture 100 may include a power provider 102, a power consumer 104, and an anomaly detection service 106. In some aspects, the power provider 102 may be electrically coupled to the power consumer 104 via a power meter 108, or other device for monitoring and/or recording consumption data of the power consumer 104. In some aspects, the electrical coupling may include a power line or other means for providing electricity to the power consumer 104, such that the power consumer 104 may consume electricity for things such as lighting, for example via light(s) 110 and/or air conditioning (A/C) 112. Other electrical appliances may also be powered via the electricity provided by the power provider 102. Additionally, the power meter 108 may be configured to monitor, receive, record, and/or transmit the consumption data related to the appliances or other household needs of the power consumer 104.

In at least one example embodiment of the invention, the power provider 102 may also be electrically coupled to the anomaly detection service 106, such that the anomaly detection service 106 is powered by the power provider. As such, the anomaly detection service 106 may reside locally at the power provider 102 or may be remote. Further, in some aspects, the power provider 102, the power consumer 104, and/or the anomaly detection service 106 may be communicatively coupled over a private or public network (such as the Internet), or a plurality of networks 114. Similarly, the power meter 108 may be communicatively coupled to the power provider 102, the power consumer 104, and/or the anomaly detection service 106 over the network(s) 114.

In some aspects, the power meter 108 may record power consumption data of the power consumer 104. This power consumption data may be recorded locally and/or transmitted to the power provider 102 and/or anomaly detection service 106 for further processing. This processing may include anomaly detection and/or removal as well as consumption baseline assessments. Similarly, in some aspects, the anomaly detection and/or removal and/or the baseline assessments may be performed at the power meter 108 and later transmitted to the power provider 102 and/or anomaly detection service 106.

The technical effects of certain embodiments of the invention may include detecting anomalous consumption days within consumer consumption data, thus allowing more accurate baseline settings and/or demand response assessments. Additionally, by detecting anomalous days, demand response programs can better establish baselines for billing consumers (and identify potential gaming of the system by consumers) as well as provide better assessments of customer response to demand response events.

Figure 2:
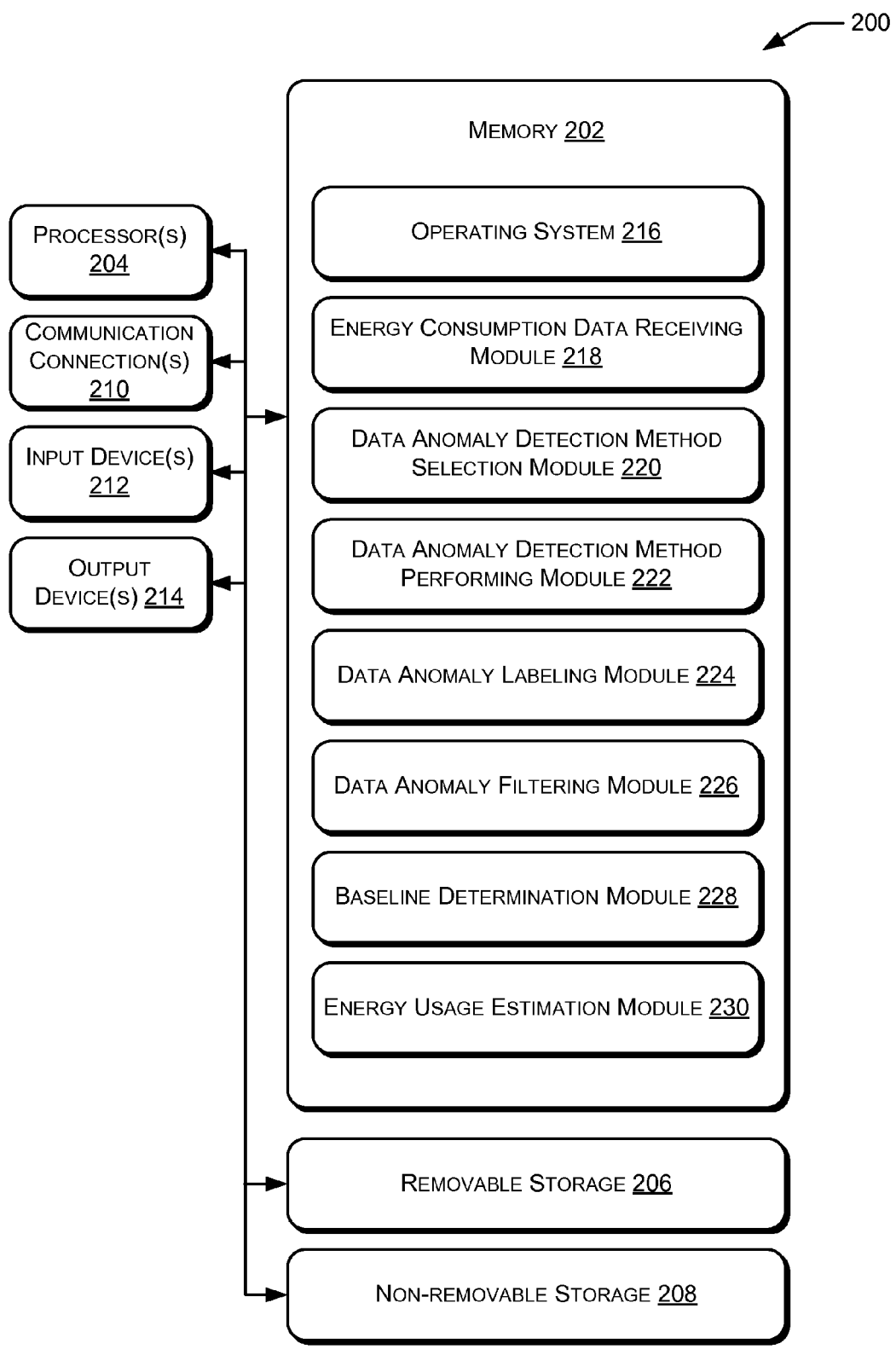
FIG. 2 illustrates a block diagram of an example computing environment showing an illustrative system in which anomaly detection may be performed, according to an illustrative embodiment of the invention.

FIG. 2 provides an illustrative overview of one computing environment 200, in which aspects of the invention may be implemented. The computing environment 200 may be configured as any suitable computing device capable of implementing a system for performing anomaly detection and/or removal. By way of example and not limitation, suitable computing devices may include personal computers (PCs), servers, server farms, datacenters, or any other device capable of storing and executing all or part of the power provider 102, the anomaly detection service 106, or the power meter 108.

In one illustrative configuration, the computing device 200 comprises at least a memory 202 and one or more processing units (or processor(s)) 204. The processor(s) 204 may be implemented as appropriate in hardware, software, firmware, or combinations thereof. Software or firmware implementations of the processor(s) 204 may include computer-executable or machine-executable instructions written in any suitable programming language to perform the various functions described.

Memory 202 may store program instructions that are loadable and executable on the processor(s) 204, as well as data generated during the execution of these programs. Depending on the configuration and type of computing device 200, memory 202 may be volatile (such as random access memory (RAM)) and/or non-volatile (such as read-only memory (ROM), flash memory, etc.). The computing device or server may also include additional removable storage 206 and/or non-removable storage 208 including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 202 may include multiple different types of memory, such as static random access memory (SRAM), dynamic random access memory (DRAM), or ROM.

Memory 202, removable storage 206, and non-removable storage 208 are all examples of computer-readable storage media. For example, computer-readable storage media may include volatile and non-volatile, removable and non-removable media implemented in any method or technology for storage of information such as computer-readable instructions, data structures, program modules or other data. Memory 202, removable storage 206, and non-removable storage 208 are all examples of computer storage media. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the server or other computing device. Combinations of any of the above should also be included within the scope of computer-readable media.

Alternatively, computer-readable communication media may include computer-readable instructions, program modules, or other data transmitted within a data signal, such as a carrier wave or other transmission. However, as used herein, computer-readable storage media does not include computer-readable communication media.

The computing environment 200 may also contain communication connection(s) 210 that allow the computing environment 200 to communicate with a stored database, and/or another computing device or server. The computing environment 200 may also include input device(s) 212 such as a keyboard, mouse, pen, voice input device, touch input device, etc., and output device(s) 214, such as a display, speakers, printer, etc.

Turning to the contents of the memory 202 in more detail, the memory 202 may include an operating system 216 and one or more application programs or services for implementing the features disclosed herein including an energy consumption data receiving module 218. The energy consumption data receiving module 218, as described above, may be configured to receive consumption data associated with a power consumer, such as but not limited to the power consumer 104 of FIG. 1. In some aspects, the energy consumption data receiving module 218 may be configured to receive and/or store consumption data of a specified time period (e.g., a year, month, week, day, hour, or the like), data based on weather conditions, data based on date/time, and/or consumer appliance data.

The memory 202 may also include an anomaly detection method selection module 220 and an anomaly detection method performing module 222. In some instances, the anomaly detection method selection module 220 may select an anomaly detection method to be used by the anomaly detection method performing module 222. The anomaly detection method selection module 220 may be configured to receive a granularity and/or other information associated with the consumption data received by the energy consumption data receiving module 218. As noted above, this consumption data may be associated with the power consumer 104 of FIG. 1 and received from the power consumer 104 or the power meter 108. Similarly, it is possible that the data is received and processed by the anomaly detection service 106 or the power provider 102. In some aspects, the anomaly detection method selection module 220 may be configured to select an algorithm for anomaly detection based on the granularity of the data and/or whether threshold values exist in historical data associated with the consumption data.

For example, the anomaly detection method selection module 220 may select a distribution-based algorithm when the granularity of the consumption data is roughly sixty minutes or less. Similarly, the anomaly detection method selection module 220 may select a regression-based algorithm or an attribute-based algorithm when the granularity of the consumption data is more than sixty minutes. However, in some aspects, selection between the regression-based and the attribute-based algorithms may be based on whether a threshold value exists from prior knowledge or historical data. That is, the regression-based algorithm may be selected when a threshold value exists from prior knowledge or historical data while the attribute-based algorithm may be selected when no threshold value exists.

In one example embodiment of the invention, the anomaly detection method performing module 222 may perform the algorithm selected by the anomaly detection method selection module 220. That is, the anomaly detection method performing module 222 may perform the distribution-based algorithm when the granularity of the consumption data is roughly sixty minutes or less. In some examples, the distribution-based algorithm may utilize hourly or shorter-time-period consumption data directly to identify anomalies. Additionally, the anomaly detection method performing module 222 may perform the regression-based algorithm or an attribute-based algorithm when the granularity of the consumption data is more than sixty minutes. In some aspects, the regression-based algorithm may be performed based on the correlation between energy consumption and temperature (e.g., days with abnormally high temperature/usage patterns may be identified as anomalous). Further, in some aspects, with the attribute-based algorithm, daily-level summary attributes may be first generated from the consumption data, and clustering algorithms may be performed using the summary attributes.

The memory 202 may also include an anomaly labeling module 224, an anomaly filtering module 226, a baseline determination module 228, and an energy usage estimation module 230. In some aspects, the anomaly labeling module 224 may be configured to label the anomalies detected by the anomaly detection method performing module 222. For example, if a distribution-based algorithm was selected and performed by the anomaly detection method selection module 220 and the anomaly detection method performing module 222, respectively, certain days within the consumption data may have been detected as containing anomalous data. That is, days one and nine of a ten day sample, for example, may contain data not indicative of "normal" power consumption for the consumer being monitored. In this case, the anomaly labeling module 224 would label days one and nine as anomalous. Further, in some aspects, the anomaly filtering module 226 may filter (i.e., remove) the labeled points from the consumption data. Based on the above scenario, for example, the anomaly filtering module 226 may remove the data associated with days one and nine from the energy consumption data. The baseline determination module 228 and the energy usage estimation module 230 may then determine a baseline pattern and estimate energy usage, respectively, based on the filtered consumption data.

Various instructions, methods, and techniques described herein may be considered in the general context of computer-executable instructions, such as program modules, executed by one or more computers or other devices. Generally, program modules include routines, programs, objects, components, data structures, etc., for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on some form of computer-readable storage media.

The example architecture 100 and computing environment 200 shown in FIGS. 1 and 2 are provided by way of example only. Numerous other operating environments, system architectures, and device configurations are possible. Accordingly, embodiments of the present invention should not be construed as being limited to any particular operating environment, system architecture, or device configuration.

Figure 3:
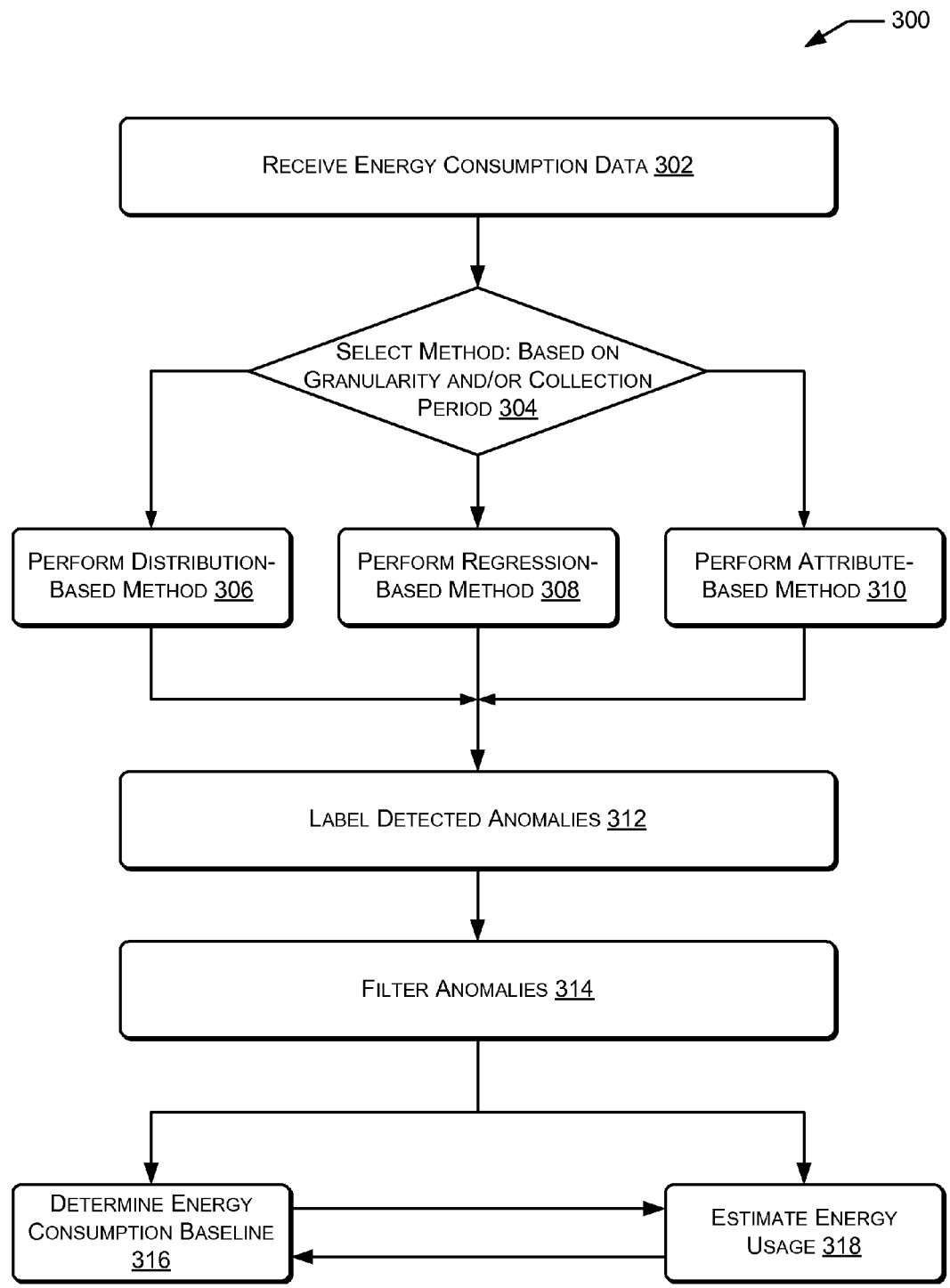
FIG. 3 illustrates a flow diagram of one example method for performing anomaly detection, according to an illustrative embodiment of the invention.

FIG. 3 is a flow diagram of an illustrative process 300 for performing anomaly detection, as described with reference to FIGS. 1 and 2. In one example, the illustrative power provider 102, the illustrative anomaly detection service 106, the illustrative power meter 108, or the example computing environment 200 may perform any or all of the operations of process 300. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

In this particular implementation, the process 300 may begin at block 302 in which the process 300 may receive energy consumption data from a power consumer 104, a power meter 108, an anomaly detection service 106, and/or a power provider 102. At block 304, the process 300 may determine, based on a granularity and/or collection period of the received data, a method or algorithm to be selected. In some examples, the process 300 may determine whether the granularity of the consumption data is more or less than sixty minutes. That is, whether the data is associated with hourly readings, daily readings, or the like. The process 300 may also determine whether a threshold exists within historical data associated with the consumption data. In some aspects, when the process 300 determines that the granularity of the consumption data is greater than sixty minutes, the process 300 may proceed to perform a distribution-based method at block 306. In some examples, when the process 300 determines that the granularity of the consumption data is less than sixty minutes or when a threshold value exists within the historical data, the process may proceed to perform a regression-based method at block 308. Alternatively, in some examples, when the process 300 determines that the granularity of the consumption data is less than sixty minutes or when a threshold value does not exist within the historical data, the process may proceed to perform an attribute-based method at block 310.

The process 300 may then label the detected anomalies at block 312. In this way, anomalous data uncovered during any of the methods performed at blocks 306, 308, and/or 310 may be labeled so that the process 300 may filter, or otherwise remove, the labeled data at block 314. The process 300 may then either determine an energy consumption baseline based on the filtered data at block 316 or estimate energy usage based on the filtered data at block 318. In some aspects, upon determining the baseline at block 316, the process 300 may also estimate energy usage at block 318; however, this may be optional. Additionally, in some aspects, upon estimating the energy usage at block 318, the process 300 may also determine a baseline at block 316; however, this may be optional as well.

Illustrative systems and methods of performing anomaly detection and/or removal are described above. Some or all of these systems and methods may, but need not, be implemented at least partially by architectures such as those shown in FIGS. 1 and/or 2. It should be understood that certain acts in the methods need not be performed in the order described, may be rearranged, modified, and/or may be omitted entirely, depending on the circumstances. Also, any of the acts described above with respect to any method may be implemented by a processor or other computing device based on instructions stored on one or more computer-readable storage media.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

That which is claimed:

1. A system, comprising:
   at least one memory that stores computer-executable instructions;
   at least one processor configured to access the at least one memory, wherein the at least one processor is configured to execute the computer-executable instructions to:
   receive, from a data provider, energy consumption data of a location;
   select, based at least in part on a collection period of the energy consumption data, an algorithm for detecting anomalies in the energy consumption data;
   perform the algorithm on the energy consumption data to detect the anomalies in the energy consumption data; and
   determine an energy consumption baseline for the location based at least in part on a result of the algorithm;
   wherein the algorithm comprises an attribute-based algorithm, a distribution-based algorithm, or a regression-based algorithm and wherein the attribute-based algorithm is selected when no threshold value exists from historical data or when a granularity of the energy consumption data is more than sixty (60) minutes.

2. The system of claim 1, wherein the at least one processor is further configured to execute the computer-executable instructions to label the detected anomalies.

3. The system of claim 1, wherein the at least one processor is further configured to execute the computer-executable instructions to filter the detected anomalies from the energy consumption data.

4. The system of claim 3, wherein the at least one processor is further configured to execute the computer-executable instructions to estimate energy usage at the location based at least in part on the filtered energy consumption data.

5. The system of claim 1, wherein the distribution-based algorithm is selected when a granularity of the energy consumption data is sixty (60) minutes or less.

6. The system of claim 1, wherein the regression-based algorithm is selected when a threshold value exists from historical data or when a granularity of the energy consumption data is more than sixty (60) minutes.

7. The system of claim 1, wherein the regression-based algorithm is based at least in part on a correlation between energy consumption at the location and temperature at the location.

8. The system of claim 1, wherein the attribute-based algorithm is based at least in part on clustering pre-generated, daily-level summary attributes.

9. One or more non-transitory computer-readable media storing computer-executable instructions that, when executed by at least one processor, configure the at least one processor to perform operations comprising:
   receiving, from a data provider, energy consumption data of a facility of a customer;
   determining a collection period of the energy consumption data;
   selecting, based at least in part on the collection period of the energy consumption data, an algorithm for detecting anomalies in the energy consumption data;
   performing the algorithm on the energy consumption data to detect the anomalies in the energy consumption data;
   determining an energy consumption baseline for the location based at least in part on a result of the algorithm;
   labeling, based at least in part on the result of the algorithm, the detected anomalies; and
   filtering the detected anomalies from the energy consumption;
   wherein the algorithm comprises an attribute-based algorithm, a distribution-based algorithm, or a regression-based algorithm and wherein the attribute-based algorithm is selected when no threshold value exists from historical data or when a granularity of the energy consumption data is more than sixty (60) minutes.

10. The one or more non-transitory computer-readable media of claim 9, further comprising estimating energy usage at the location based at least in part on the filtered energy consumption data.

11. The one or more non-transitory computer-readable media of claim 9, wherein the distribution-based algorithm is selected when a granularity of the energy consumption data is sixty (60) minutes or less.

12. The one or more non-transitory computer-readable media of claim 9, wherein the regression-based algorithm is selected when a threshold value exists from historical data or when a granularity of the energy consumption data is more than sixty (60) minutes.

13. The one or more non-transitory computer-readable media of claim 9, wherein the regression-based algorithm is based at least in part on a correlation between energy consumption at the location and temperature at the location.

14. The one or more non-transitory computer-readable media of claim 9, wherein the attribute-based algorithm is based at least in part on clustering pre-generated, daily-level summary attributes.

* * * * *